United States Patent
Hamazu et al.

(10) Patent No.: US 7,339,119 B2
(45) Date of Patent: Mar. 4, 2008

(54) HARNESS OUTLET STRUCTURE OF ENGINE

(75) Inventors: Akira Hamazu, Saitama (JP); Mamoru Mikame, Saitama (JP); Daisuke Hayashi, Saitama (JP); Kiyoaki Yokoyama, Saitama (JP); Hiroshi Uruno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/394,282

(22) Filed: Mar. 31, 2006

(65) Prior Publication Data

US 2006/0219424 A1  Oct. 5, 2006

(30) Foreign Application Priority Data

Apr. 1, 2005 (JP) ............................. 2005-106029

(51) Int. Cl.
*H02G 3/00* (2006.01)

(52) U.S. Cl. .................... 174/356; 174/72 A; 174/650

(58) Field of Classification Search ................. 174/35, 174/360, 371, 669, 72 A, 358, 650, 654, 174/664

See application file for complete search history.

(56) References Cited

U.S. PATENT DOCUMENTS 5,091,605 A * 2/1992 Clifford ...................... 174/650
2003/0084538 A1* 5/2003 Fukumoto et al. ............ 16/2.1

FOREIGN PATENT DOCUMENTS

JP 2004-251271 A 9/2004

* cited by examiner

*Primary Examiner*—Jinhee Lee
(74) *Attorney, Agent, or Firm*—Birch, Stewart, Kolasch & Birch, LLP

(57) ABSTRACT

A harness outlet structure of an engine permitting a reliable shield at a harness outlet of the engine. The structure includes a wiring harness is clamped by a shield cover and an engine main body via a grommet bracket. The grommet bracket includes a groove having a width equivalent to the thickness of the shield cover disposed circumferentially between two flange portions of the grommet bracket. A harness overall for shielding the wiring harness is mounted externally on a proximal end of the grommet bracket. The harness overall is a shield outer jacket body formed from braided metal fibers. The harness overall is inserted over an outside of the proximal end of the grommet bracket until one end of the harness overall contacts the flange portion. The harness overall is then joined by a coupling ring.

20 Claims, 6 Drawing Sheets

HARNESS OUTLET STRUCTURE OF ENGINE

CROSS-REFERENCE TO RELATED APPLICATION

The present application claims priority under 35 U.S.C. §119 to Japanese Patent Application No. 2005-106029, filed Apr. 1, 2005, the entire contents of which are hereby incorporated by reference.

BACKGROUND OF THE INVENTION

1. Field of the Invention

The present invention relates generally to a harness outlet structure of an engine and, more particularly, to a structure that gives an area near an outlet of a harness a highly reliable electromagnetic wave shielding function.

2. Description of Background Art

Effective measures against electromagnetic waves and large currents should be taken for electric components provided as accessories for aircraft engines. Japanese Patent Laid-open No. 2004-251271 discloses an art, in which electromagnetic fuel injection valves, ignition coils, and other electric components disposed in areas around an intake chamber of an engine are covered and shielded with a shield cover mounted on an engine main body so as to cover part of the intake chamber.

While capable of shielding the electric components themselves, the prior art arrangement was not able to shield properly a wiring harness routed from these electric components to areas outside the engine. It is to be noted herein that an outer jacket structure for shielding the wiring harness itself, which is well-known, may be applied to the wiring harness; however, if there is a clearance at an outlet of the harness on an edge portion of the shield cover from the wiring harness, through which electromagnetic waves pass, shielding becomes simply incomplete relative to the inside of the shield cover.

SUMMARY AND OBJECTS OF THE INVENTION

It is an object of the present invention to solve the aforementioned problem of the prior art and provide a harness outlet structure of an engine that is capable of providing a reliable shield from electromagnetic waves at the harness outlet disposed between the engine and the edge portion of the shield cover.

To achieve the foregoing object, the present invention is characterized in the following arrangements made in a harness outlet structure for shielding a wiring harness of electric components disposed at an upper portion of an engine and covered with a shield cover from an electromagnetic wave at an outlet of the wiring harness at an edge portion of the shield cover. Specifically:

According to a first aspect of the present invention, the harness outlet structure includes a grommet bracket, a wiring harness, a harness outer jacket body, and a fastening member. The grommet bracket is clamped between the engine and the edge portion of the shield cover at the outlet of the wiring harness. The wiring harness is passed through an inside of the grommet bracket. The harness outer jacket body shields a portion of the wiring harness exposed from the shield cover. The fastening member fastens one end of the harness outer jacket body onto the grommet bracket.

According to a second aspect of the present invention, the grommet bracket includes a cylindrical barrel portion, a first flange portion, and a second flange portion. The cylindrical barrel portion is a part through which the wiring harness is passed. The first flange portion is provided in a standing condition circumferentially on a surface of the barrel portion at a position away from a first end portion of the barrel portion. The second flange portion is provided in a standing condition circumferentially at a position away from the first flange portion toward a side of a second end portion of the barrel portion. The second aspect of the present invention is further characterized in that the harness outer jacket body is mounted externally onto the first end portion of the barrel portion of the grommet bracket until a leading end of the harness outer jacket body contacts the first flange portion. Further, the leading end of the harness outer jacket body is fastened to the first end portion of the barrel portion of the grommet bracket by the fastening member.

According to a third aspect of the present invention, the engine and the edge portion of the shield cover clamp a gap portion between the first and the second flange portions of the grommet bracket.

According to a fourth aspect of the present invention, the edge portion of the shield cover clamps the grommet bracket via a conductive gasket.

The following effects can be achieved according to the present invention. Specifically:

In accordance with the first aspect of the present invention, the shield cover and the shield outer jacket body of the wiring harness are connected via the grommet bracket so as to be shielded from the electromagnetic wave (with no clearance involved with respect to the electromagnetic wave). Accordingly, the electric components and the wiring harness thereof accommodated under the shield cover can be efficiently shielded.

In accordance with the second aspect of the present invention, the shield outer jacket body of the wiring harness can be fastened to the grommet bracket reliably and simply so as to be shielded from the electromagnetic wave.

In accordance with the third aspect of the present invention, the engine and the edge portion of the shield cover can be fastened to the grommet bracket reliably and simply so as to be shielded from the electromagnetic wave.

In accordance with the fourth aspect of the present invention, the edge portion of the shield cover and the grommet bracket can be fastened together reliably and simply so as to be shielded from the electromagnetic wave, even if the shield cover is not a conductive metal, but a conductive plastic or the like having conductivity by including conductive metal particles or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
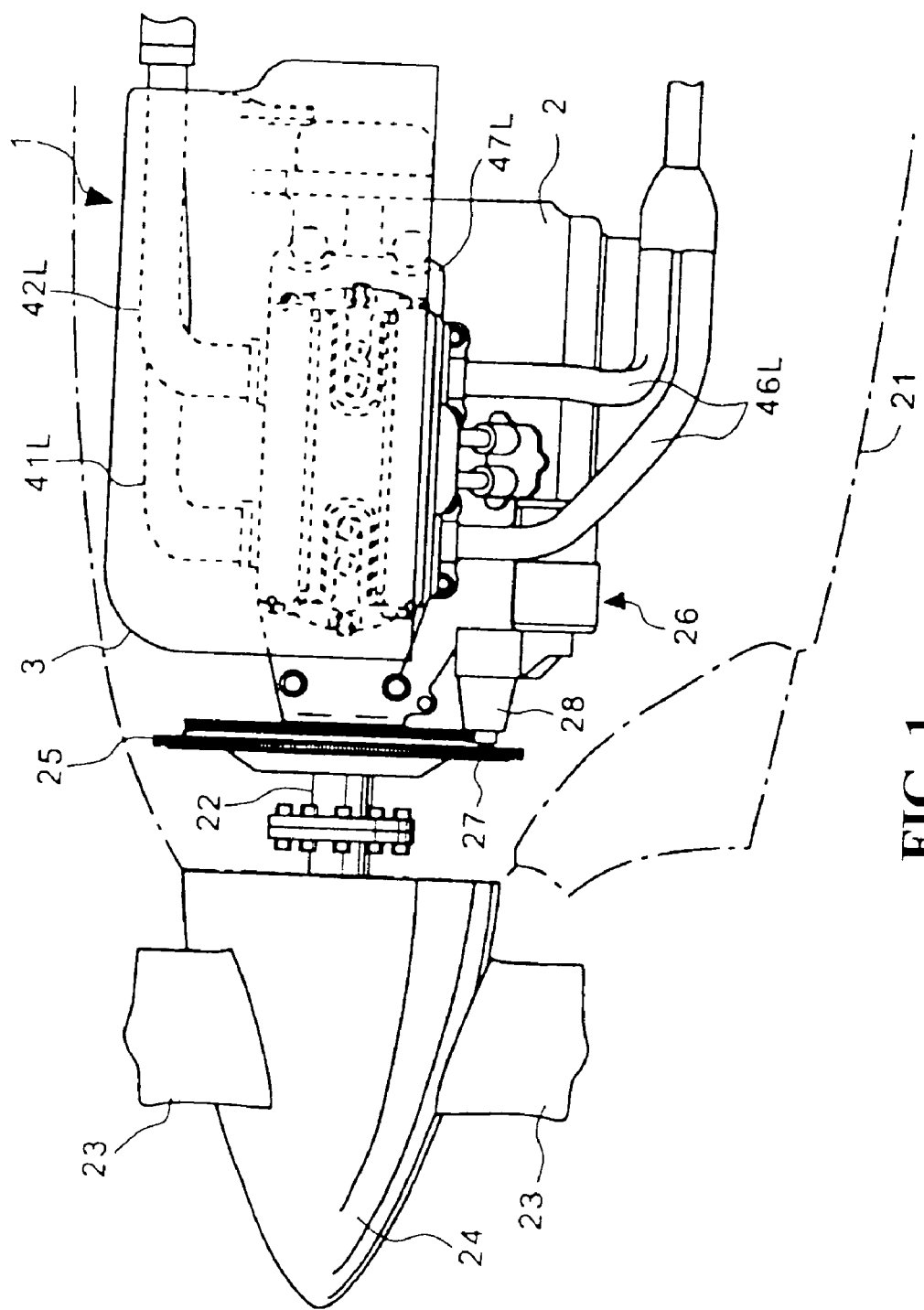
FIG. 1 is a side elevational view showing an aircraft engine, to which a harness outlet structure according to a preferred embodiment of the present invention is applied, mounted in an aircraft.
Figure 2:
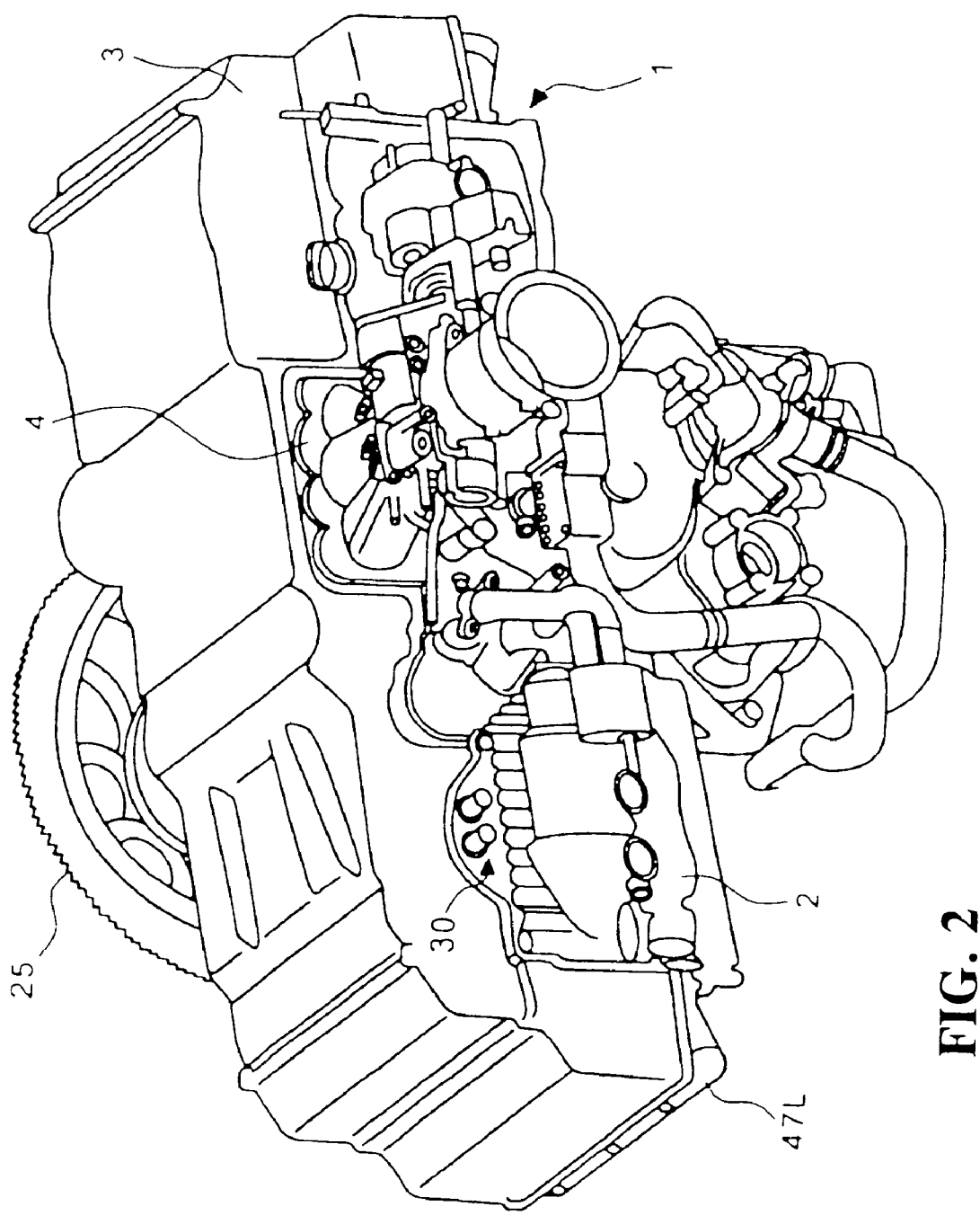
FIG. 2 is a perspective view showing the aircraft engine, to which a harness outlet structure according to a preferred embodiment of the present invention is applied, as viewed from a left rearward and upward portion of the aircraft.
Figure 3:
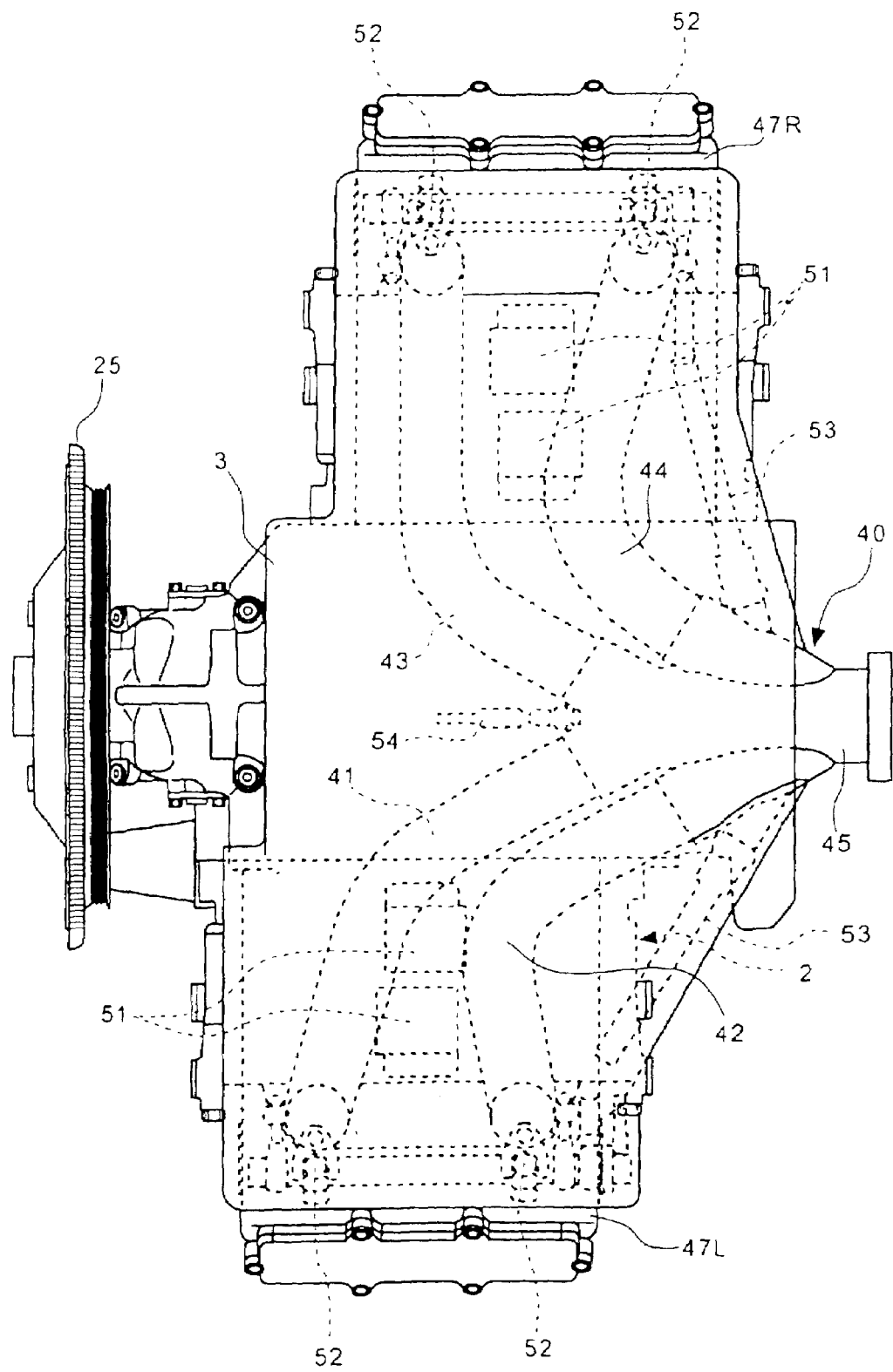
FIG. 3 is a plan view of the aircraft engine, to which a harness outlet structure according to a preferred embodiment of the present invention is applied.

FIG. 1 is a side elevational view showing an aircraft engine, to which a harness outlet structure according to the preferred embodiment of the present invention is applied, mounted in an aircraft. FIG. 2 is a perspective view showing the aircraft engine as viewed from a left rearward and upward portion of the aircraft. FIG. 3 is a plan view of the aircraft engine.

An aircraft engine 1 includes a horizontally opposed 4-cylinder, 4-cycle engine main body 2 and a shield cover 3. The shield cover 3 covers to shield completely major portions of an upper portion and right and left side faces of the engine main body 2 such that there are produced no clearances. The engine main body 2 is housed in a cowl 21 mounted on a front portion of a fuselage so that an axis of a crankshaft 22 extends along the fore-aft direction. A spinner 24 including a plurality of propellers 23 is disposed forward of the cowl 21. The spinner 24 is coaxially coupled, together with a ring gear 25, to the crankshaft 22. A starter 26 includes a starting motor 28 and a pinion 27 mounted on a rotational shaft of the starting motor 28. When the starting motor 28 reaches a predetermined speed, the pinion 27 protrudes to come into mesh with the ring gear 25, which starts the engine.

Each of left and right cylinder heads 47L, 47R includes an exhaust port (not shown) disposed on a lower portion thereof A left and a right exhaust pipe 46L, 46R are routed downwardly around the engine main body 2 and then extended rearwardly. Each of the left and right exhaust pipes 46L, 46R is coupled to the corresponding one the exhaust ports.

Referring also to FIG. 3, an intake manifold 40 is disposed upward of the engine main body 2. The intake manifold 40 includes intake pipes 41L, 42L, 43R, and 44R of corresponding cylinders, and a converging intake pipe 45 for connecting commonly upstream ends of these intake pipes 41L, 42L, 43R, and 44R. Each of the intake pipes 41L, 42L, 43R, and 44R is formed so as to be curved rearwardly at an area upward of the engine main body 2. The converging intake pipe 45 disposed upward of a rear portion of the engine main body 2 is connected to an intake chamber not shown.

An ignition coil 51 and an electromagnetic fuel injection valve 52 are disposed for each cylinder at the area upward of the engine main body 2. Also disposed are an intake air pressure sensor 53, an intake air temperature sensor 54, and other electric components. All these electric components are covered by the shield cover 3 from electromagnetic waves with no clearance involved therebetwveen. The shield cover 3 is formed from a synthetic resin or the like including a steel plate or a metallic filler. An opening edge portion of the shield cover 3 is formed so as to be abutted on the engine main body 2 with no clearance involved therebetween. An abutment portion between the opening edge of the shield cover 3 and the engine main body 2 includes an outlet 30 for a wiring harness connecting electrically the electric components accommodated under the shield cover 3 to a control unit as shown in FIG. 2.

Figure 4:
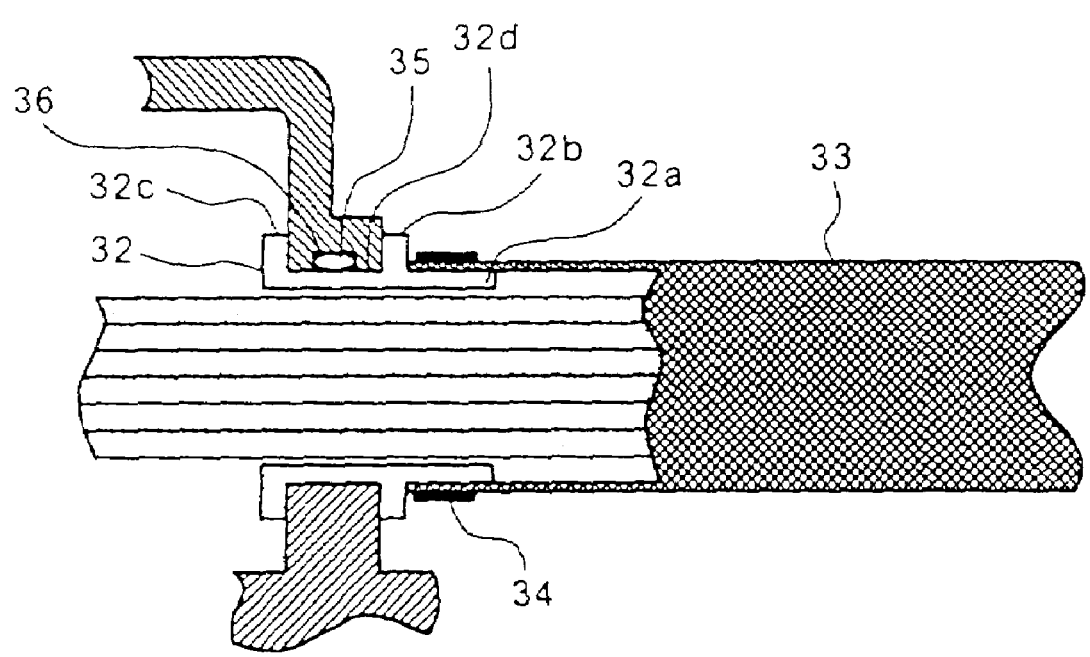
FIG. 4 is a cross-sectional, partly broken away view showing the harness outlet structure according the embodiment of the present invention.
Figure 5:
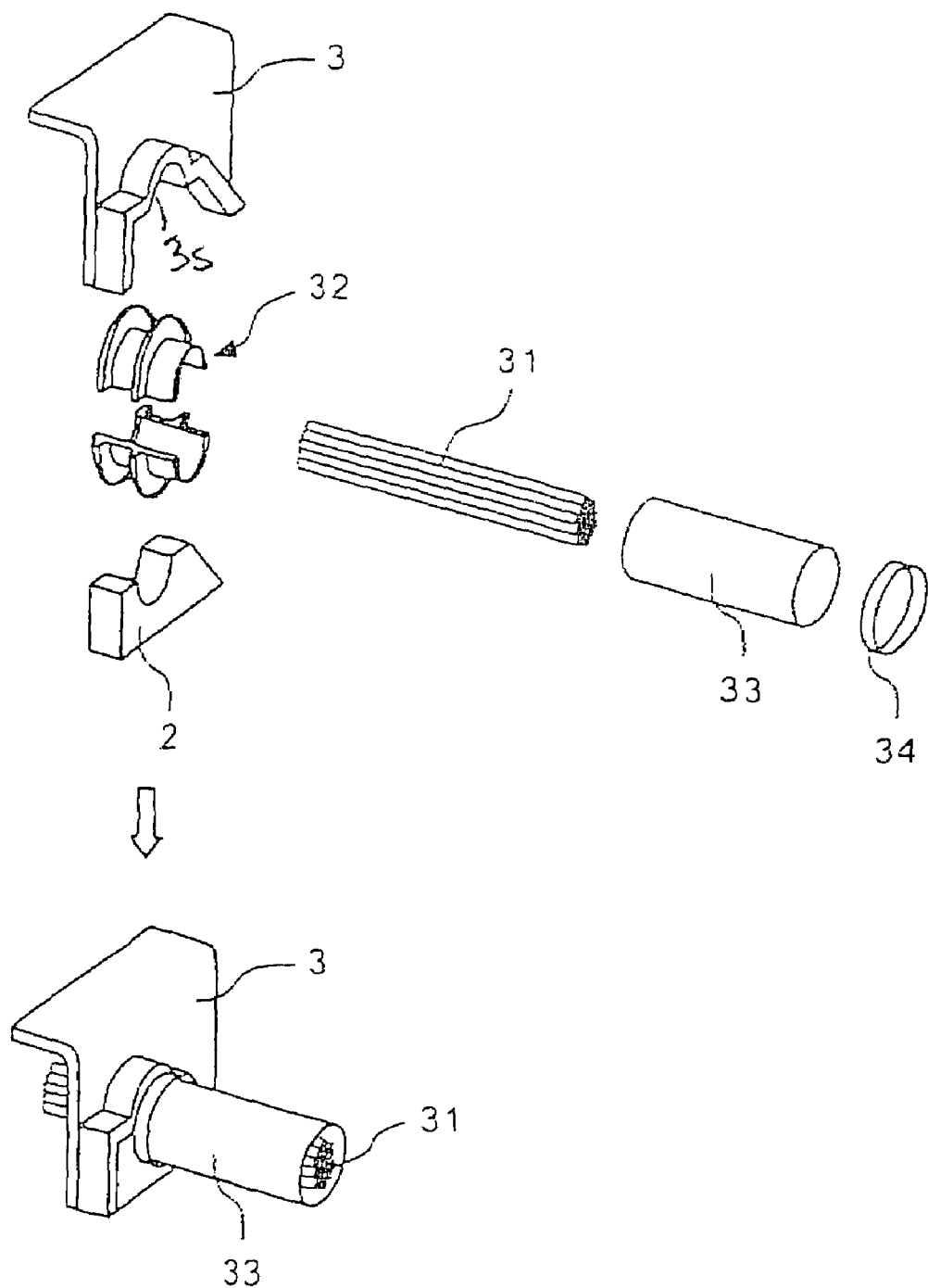
FIG. 5 is an assembly drawing showing the harness outlet structure according the first embodiment of the present invention.

FIG. 4 is a cross-sectional, partly broken away view showing the harness outlet structure according the first embodiment of the present invention. FIG. 5 is an assembly drawing showing the harness outlet structure according the first embodiment of the present invention. Like parts are identified by the same reference numerals as in the earlier Figures.

A wiring harness 31 formed from a multiplicity of wires bundled up together is clamped between an edge portion of the shield cover 3 and the engine main body 2 via a grommet bracket 32. The grommet bracket 32 is formed by combining together a pair of grommet bracket pieces divided by a plane extending along an axis. The grommet bracket 32 includes a barrel portion 32a and two flange portions 32b, 32c. The barrel portion 32a is of a cylindrical shape, into which the wiring harness 31 is inserted. The flange portions 32b, 32c are provided in a standing condition circumferentially on the barrel portion 32a at two places along an axial direction of the barrel portion 32a.

A first flange portion 32c is disposed on an end portion of the barrel portion 32a. A second flange portion 32b is disposed at a position a distance corresponding to a thickness of the edge portion of the shield cover 3 away from the first flange portion 32c. To state it another way, the grommet bracket 32 includes a groove 32d having a width equivalent to the thickness of the edge portion of the shield cover 3 disposed circumferentially between the flange portions 32b, 32c. The edge portion of the shield cover 3 includes a slit 3s formed to match the shape of the groove 32d. Further, a conductive gasket 35 is disposed in a groove 36 formed along slit 3s of shield cover 3. Accordingly, the grommet bracket 32 is clamped between the shield cover 3 and the engine main body 2 in a manner that eliminates any clearance with respect to the electromagnetic wave.

A harness overall 33 for shielding the wiring harness 31 is mounted externally on the end of the grommet bracket 32 adjacent to the second flange portion 32b, or the proximal end of the grommet bracket 32. The harness overall 33 is a shield outer jacket body formed from braided metal fibers. The harness overall 33 is inserted over the outside of the proximal end of the grommet bracket 32 until a leading end of the harness overall 33 contacts the second flange portion 32b. The harness overall 33 is then joined by a coupling ring 34.

In accordance with the first embodiment of the present invention, the shield cover 3 and the outer jacket body 33 of the wiring harness 3 1 are coupled via the grommet bracket 32 such that there is no clearance involved with respect to the electromagnetic wave. Accordingly, the electric components and the wiring harness 31 therefor accommodated under the shield cover 3 can be completely shielded. Further, according to the first embodiment of the present invention, the grommet bracket 32 is a two-part structure. This arrangement allows the grommet bracket 32 to be easily mounted on the wiring harness 31.

Figure 6:
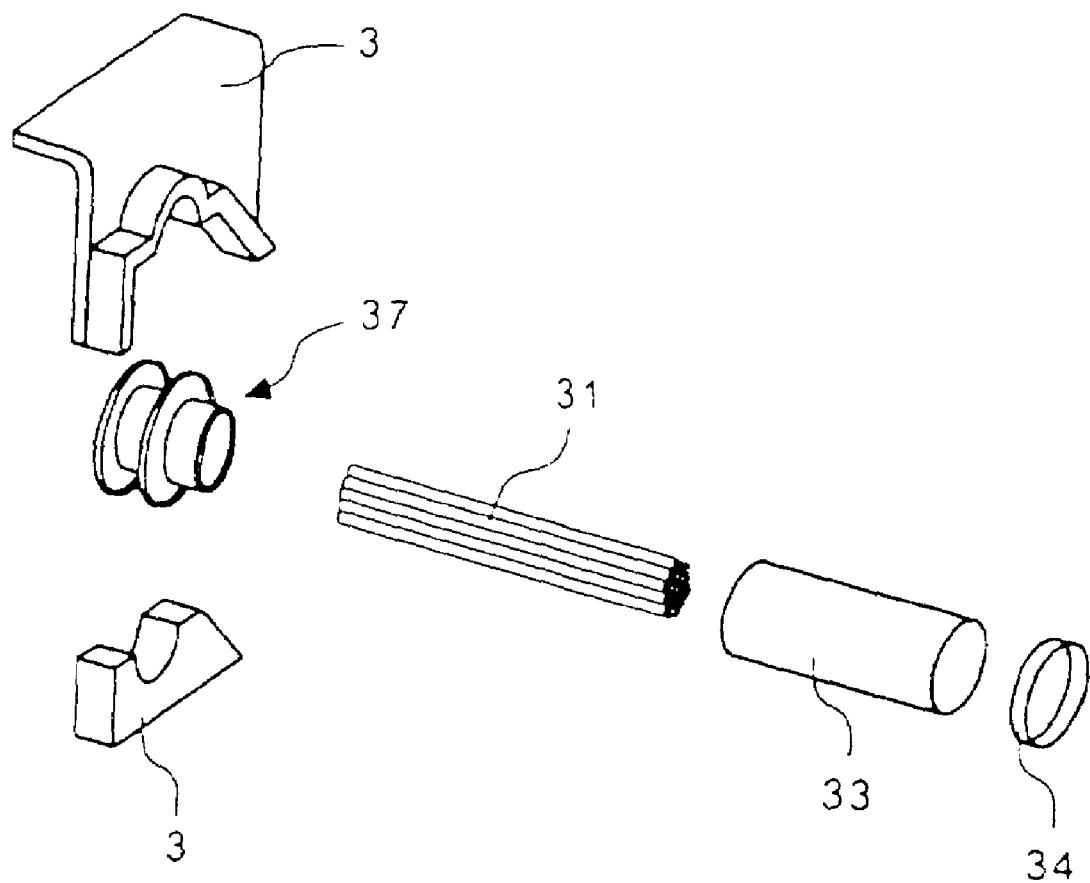
FIG. 6 is an assembly drawing showing a harness outlet structure according the second embodiment of the present invention.

FIG. 6 is an assembly drawing showing a harness outlet structure according a second embodiment of the present invention. Like parts are identified by the same reference numerals as in FIG. 5.

The harness outlet structure according the second embodiment of the present invention differs from the harness outlet structure according the first embodiment of the present invention in that the grommet bracket 32 is not a two-part type, but an integral type. According to the second embodiment of the present invention, the grommet bracket 32 can only be mounted from an end portion of the wiring harness. The second embodiment of the present invention nonetheless permits reduction in the number of parts used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A harness outlet structure for shielding a wiring harness of electric components disposed at an upper portion of an engine and covered with a shield cover from an electromagnetic wave at an outlet of the wiring harness at an edge portion of the shield cover, the harness outlet structure comprising:
    a grommet bracket clamped between the engine and the edge portion of the shield cover at the outlet of the wiring harness, the wiring harness passing through an inside of the grommet bracket;
    a harness outer jacket body for shielding a portion of the wiring harness exposed from the shield cover; and
    a cylinder-shaped fastening member that is formed separately from the harness outer jacket body, the fastening member for surrounding one end of the harness outer jacket body in order to fasten the one end of the harness outer jacket body onto the grommet bracket,
    wherein the edge portion of the shield cover includes a slit formed to match a shape of a groove of the grommet bracket, and
    wherein a conductive gasket is disposed in another groove formed along the slit in the edge portion of the shield cover, in order to eliminate a clearance with respect to an electromagnetic wave.

2. The harness outlet structure according to claim 1, wherein the grommet bracket includes:
    a cylindrical barrel portion, through which the wiring harness passes;
    a first flange portion provided in a standing condition circumferentially on a surface of the barrel portion at a position at a first end portion of the barrel portion; and
    a second flange portion provided in a standing condition circumferentially at a position away from the first flange portion at a central portion of the barrel portion;
    wherein the harness outer jacket body is mounted externally onto the second end portion of the barrel portion of the grommet bracket until a leading end of the harness outer jacket body contacts the second flange portion; and
    wherein the leading end of the harness outer jacket body is fastened to the second end portion of the barrel portion of the grommet bracket by the fastening member.

3. The harness outlet structure according to claim 2, wherein the engine and the edge portion of the shield cover clamp a gap portion between the first and the second flange portions of the grommet bracket.

4. The harness outlet structure according to claim 3, wherein the edge portion of the shield cover clamps the grommet bracket via the conductive gasket.

5. The harness outlet structure according to claim 1, wherein the fastening member is a coupling ring.

6. The harness outlet structure according to claim 1, wherein the harness outer jacket body is formed of braided metal fibers.

7. The harness outlet structure according to claim 1, wherein the grommet bracket is a single part bracket.

8. The harness outlet structure according to claim 1, wherein the grommet bracket includes at least one flange portion, the harness outer jacket body being inserted over an outside of a proximal end of the grommet bracket until a leading end of the harness outer jacket body contacts the flange portion of the grommet bracket.

9. The harness outlet structure according to claim 1, wherein the grommet bracket is a two part bracket.

10. A harness outlet structure for shielding a wiring harness of electric components disposed at an upper portion of an engine and covered with a shield cover from an electromagnetic wave at an outlet of the wiring harness at an edge portion of the shield cover, the harness outlet structure comprising:
    a grommet bracket clamped at one end between the engine and the edge portion of the shield cover at the outlet of the wiring harness, the wiring harness passing through an inside of the grommet bracket;
    a harness outer jacket body for shielding a portion of the wiring harness exposed from the shield cover; and
    a fastening member for fastening one end of the harness outer jacket body onto an opposite end of the grommet bracket,
    wherein the shield cover is formed of a conductive plastics,
    wherein the edge portion of the shield cover includes a slit formed to match a shape of a groove of the grommet
    wherein a conductive gasket is disposed in another groove formed along the slit in the edge portion of the shield cover.

11. The harness outlet structure according to claim 10, wherein the grommet bracket includes:
    a cylindrical barrel portion, through which the wiring harness passes;
    a first flange portion provided in a standing condition circumferentially on a surface of the barrel portion at a position at a first end portion of the barrel portion; and
    a second flange portion provided in a standing condition circumferentially at a position away from the first flange portion at a central portion of the barrel portion;
    wherein the harness outer jacket body is mounted externally onto the second end portion of the barrel portion of the grommet bracket until a leading end of the harness outer jacket body contacts the second flange portion; and
    wherein the leading end of the harness outer jacket body is fastened to the second end portion of the barrel portion of the grommet bracket by the fastening member.

12. The harness outlet structure according to claim 11, wherein the engine and the edge portion of the shield cover clamp a gap portion between the first and the second flange portions of the grommet bracket.

13. The harness outlet structure according to claim 12, wherein the edge portion of the shield cover clamps the grommet bracket via the conductive gasket.

14. The harness outlet structure according to claim 10, wherein the fastening member is a coupling ring.

15. The harness outlet structure according to claim 10, wherein the harness outer jacket body is formed of braided metal fibers.

16. The harness outlet structure according to claim 10, wherein a conductive gasket is disposed in another groove formed along the slit in the edge portion of the shield cover, for clamping the grommet bracket between the shield cover and the engine in order to eliminate a clearance with respect to an electromagnetic wave.

17. A harness outlet structure for shielding a wiring harness of electric components disposed at an upper portion of an engine main body and covered with a shield cover from an electromagnetic wave at an outlet of the wiring harness at an edge portion of the shield cover, the harness outlet structure comprising:

one end of a grommet bracket clamped between the engine main body and the edge portion of the shield cover at the outlet of the wiring harness, the wiring harness passing through an inside of the grommet bracket;

a harness outer jacket body for shielding a portion of the wiring harness exposed from the shield cover; and a fastening member for fastening one end of the harness outer jacket body onto an opposite end of the grommet bracket, wherein the shield cover and the harness outer jacket body of the wiring harness are coupled so there is no clearance, thereby preventing passage of electromagnetic waves, wherein a conductive gasket is disposed in a groove formed alone a slit in the edge portion of the shield cover.

18. The harness outlet structure according to claim 17, wherein the slit on the edge portion of the shield cover matches the shape of a groove of the grommet bracket.

19. The harness outlet structure according to claim 17, wherein the grommet bracket is a two part bracket.

20. The harness outlet structure according to claim 17, wherein the grommet bracket is a one part bracket.

* * * * *